United States Patent
Provost et al.

(10) Patent No.: US 6,336,721 B1
(45) Date of Patent: Jan. 8, 2002

(54) MULTICOLOR INK JET PRINTING METHOD

(75) Inventors: John Reginald Provost, Lancashire; Peter Gregory, Bolton, both of (GB)

(73) Assignee: Zeneca Limited, London (GB)

( * ) Notice: Subject to any disclaimer, the term of this patent is extended or adjusted under 35 U.S.C. 154(b) by 0 days.

(21) Appl. No.: 09/331,962

(22) PCT Filed: Dec. 11, 1997

(86) PCT No.: PCT/GB97/03423

§ 371 Date: Aug. 27, 1999

§ 102(e) Date: Aug. 27, 1999

(87) PCT Pub. No.: WO98/29513

PCT Pub. Date: Jul. 9, 1998

(30) Foreign Application Priority Data

Dec. 31, 1996 (GB) .............................................. 9627075

(51) Int. Cl.[7] .............................................. G01D 11/00
(52) U.S. Cl. ........................................ 347/100; 347/96
(58) Field of Search ................. 347/100, 96; 106/31.27, 106/31.43

(56) References Cited

U.S. PATENT DOCUMENTS

| 4,453,945 A | * | 6/1984 | Miyamoto et al. | .......... 534/605 |
| 4,965,595 A | | 10/1990 | Yoshimura | |
| 5,273,573 A | | 12/1993 | Kappele | |
| 5,383,960 A | * | 1/1995 | Gregory et al. | ............. 347/100 |
| 5,428,383 A | * | 6/1995 | Shield et al. | ................. 347/96 |

FOREIGN PATENT DOCUMENTS

| EP | 0621367 | 10/1994 | | |
| JP | 7173419 | 7/1995 | | |
| JP | 07173419 A | * | 7/1995 | ........... C09D/11/00 |
| WO | 9427827 | 12/1994 | | |

OTHER PUBLICATIONS

Research Disclosure, Dec. 1997 (881–889) 40430 (Nov. 20, 1997).*
XP–002059648 *Colouration of Substrate for Use on Paper Overhead Project Slide Comprise Ink Jet Print First Set Ink Contain Yellow Magenta Cyan Option Black Colour Second Set Ink Dye*, Anonymous, Research Disclosure, vol. 404, No. 030, Dec. 10, 1997, Emsworth, GB (Derwent Abstract Only).

* cited by examiner

*Primary Examiner*—John Barlow
*Assistant Examiner*—Manish S. Shah
(74) *Attorney, Agent, or Firm*—Rothwell, Figg, Ernst & Manbeck (57) ABSTRACT

A method for the coloration of a substrate comprising ink jet printing a first and second set of inks onto the substrate wherein:

(a) the first set of inks consists of one or more inks each of which independently contains a colorant selected from yellow, magenta, cyan and optionally black; and (b) the second set of inks comprises one or more inks each of which independently contains a dye selected from:

a yellow dye of Formula (1) or salt thereof, an orange dye of Formula (2) or salt thereof, a red dye of Formula (3) or salt thereof and a blue dye of Formula (4) or salt thereof, wherein Formulae (1) to (4) are as defined in the description.

Also claimed is a set of inks, ink jet printer cartridges, an ink jet printer and substrates printed using the printing method.

32 Claims, 1 Drawing Sheet

Fig.1.

MULTICOLOR INK JET PRINTING METHOD

The present invention relates to a colour ink jet printing method, to a set of inks, to ink jet printer cartridges, to substrates printed using the method and to an ink jet printer.

Ink jet printing is a non-impact printing technique which involves ejecting, thermally or by action of an oscillating piezo crystal, droplets of ink from one or more fine nozzles directly onto a substrate. The ink may be aqueous, solvent or hot melt based.

The printing of textiles is conventionally carried out by screen or roller printing using gravure engraved cylinders. The design to be printed has to be engraved on to a cylinder and each individual colour in a design requires the application of a separate screen with a colour premixed to the required shade. This is a long and slow process and it can take many months for a textile design to appear as a printed textile. Consequently, there is a demand for a printing process which enables new designs to be printed onto a textile quickly for proofing purposes and for small production runs.

Ink jet printing of textiles offers the potential to transfer a design to a textile much faster than traditional textile printing methods. However, conventional colour ink jet printers operate with a colouring system which uses three subtractive primary colours (Cyan, Magenta and Yellow) together with black, hereinafter referred to as CMYK. This colouring system only provides a limited range of colours compared with conventional textile printing methods.

The limited colour range provided by conventional colour ink jet printers also limits their applicability in other imaging technologies, particularly where high resolution images are required from digital cameras or when printing images from the Internet. These "photorealistic" applications require a wide range of colours to produce images of the same photographic quality as those prepared by conventional screen printing methods.

We have surprisingly found that the colour gamut of an ink jet printer is extended close to that obtained using conventional printing methods when a combination of inks containing dyes with specific calorimetric positions in colour space are used together with a CMYK colouring system in an ink jet printer.

According to a first aspect of the present invention there is provided a method for the coloration of a substrate comprising ink jet printing a first and second set of inks onto the substrate wherein:

(a) the first set of inks consists of one or more inks each of which independently contains a colorant selected from yellow, magenta, cyan and optionally black; and (b) the second set of inks comprises one or more inks each of which independently contains a dye selected from:

a yellow dye of Formula (1) or salt thereof:

Formula (1)

wherein:
X is a labile group or atom;
$R^1$ is alkyl or $-NH_2$;
A is $-NR^2R^3$, $-OR^2$ or halogen;
$R^2$ is H or optionally substituted alkyl; and
$R^3$ is optionally substituted phenyl;

an orange dye of Formula (2) or salt thereof:

Formula (2)

wherein:
$R^4$ is H or optionally substituted alkyl;
X is as hereinbefore defined;
B is $-NR^5R^6$, $-OR^5$ or halogen; and
$R^5$ and $R^6$ independently are H or optionally substituted alkyl;

a red dye of Formula (3) or salt thereof:

Formula (3)

wherein:
X is as hereinbefore defined;
E is $-NR^7R^8$, $-OR^7$ or halogen;
each $R^7$ is independently H or alkyl; and
$R^8$ is optionally substituted aryl;

and a blue dye of Formula (4) or salt thereof:

Formula (4)

wherein:
each X independently is as hereinbefore defined;
each L independently is an optionally substituted alkylene group;
each W independently is halogen or a group of the formula $-OR^9$ or $-NR^{10}R^{11}$;
$R^9$ is H or alkyl, $R^{10}$ is H or optionally substituted alkyl; and $R^{11}$ is an optionally substituted aryl group.

In FIG. 1 the dots indicate the colour gamut from the first and second sets of inks. The crosses show the colour gamut from the first set of inks alone.

The coloration method of the present invention achieves a wide colour gamut by applying, in any combination, the inks from the hereinbefore defined first and second sets of inks to a substrate using an ink jet printer.

Preferably, the first set of inks consists of yellow, magenta and cyan inks and preferably also a black ink. Accordingly, in a preferred embodiment, the first set of inks consists of an ink containing a yellow colorant, an ink containing a magenta colorant, an ink containing a cyan colorant and an ink containing a black colorant.

The second set of inks comprises from one to four, preferably two to four and especially four inks each of which independently contains a dye selected from the hereinbefore defined dyes of the Formulae (1) to (4).

In a preferred embodiment, the second set of inks comprises an ink containing a dye of Formula (1), an ink containing a dye of Formula (2) an ink containing a dye of Formula (3) and an ink containing a dye of Formula (4).

In view of the above preferences, in an especially preferred embodiment of the present invention the first set of inks consists of an ink containing a yellow colorant, an ink containing a magenta colorant, an ink containing a cyan colorant and an ink containing a black colorant; and the second set of inks comprises an ink containing a dye of Formula (1), an ink containing a dye of Formula (2) an ink containing a dye of Formula (3) and an ink containing a dye of Formula (4).

As will be understood, the ink of the first set of inks which contains the yellow colorant is a different shade of yellow to that of the ink of the second set of inks which contains the yellow dye of Formula (1) so as to maximise the colour gamut available to the ink jet printer.

It is preferred that each of the inks in the first and second set of inks are a different colour.

The inks may be applied to the substrate in any combination, provided that at least one ink from each of the two sets is applied. The particular combination of inks selected from the first and second sets of inks will be chosen to achieve a desired colour at a specific position on the substrate. Therefore, a single ink from the first or second set of inks or any combination of inks from the first and second sets may be applied to a particular point on a substrate to achieve a specific colour at that point. By way of illustration, if a red corresponding to the colour of the red ink of the second set of inks was required at a particular point on the substrate, then that ink alone would be applied to that part of the substrate by the ink jet printer.

In the dyes of Formula (1), it is preferred that:

$R^1$ is $C_{1-4}$-alkyl or $-NH_2$, more preferably methyl, ethyl or $-NH_2$ and especially $-NH_2$;

$R^2$ is H or optionally substituted $C_{1-6}$-alkyl, more preferably H or $C_{1-4}$-alkyl and especially H, methyl and ethyl;

$R^3$ is phenyl substituted by $-COOH$, $-SO_3H$ or $-OH$, more preferably phenyl substituted by $-SO_3H$; and the group A is a group of the formula $-NR^2R^3$, $-OR^2$ or Cl, more preferably $-NR^2R^3$.

The dyes of Formula (1) may be prepared by methods analogous to those described in the art for other similar azo dyes, for example as described in EP 559 331A1, page 5, wherein the compound of formula (4) has the formula H-A.

In the dyes of Formula (2), it is preferred that:

$R^4$ is H or optionally substituted $C_{1-4}$-alkyl, more preferably H, methyl or ethyl and especially methyl;

$R^5$ and $R^6$ are preferably each independently H or $C_{1-4}$-alkyl, more preferably H; and B is preferably $-NR^5R^6$, $-OR^6$ or Cl, more preferably $-NR^5R^6$ and especially $-NHR^6$.

The dyes of Formula (2) may be prepared by methods analogous to those described in the art for similar azo dyes, for example as described in GB 859,990, Example 1.

Preferred dyes of Formula (3) are those in which:

$R^7$ is H or $C_{1-4}$-alkyl, more preferably H, methyl or ethyl and especially H;

$R^8$ is optionally substituted phenyl or naphthyl and especially phenyl optionally substituted by $C_{1-4}$-alkyl; and E is $-NR^7R^8$, $-OR^7$ or Cl, more preferably $-NR^7R^8$ and especially $-NHR^8$.

The dyes of Formula (3) may be prepared by methods analogous to those described in the art for other similar azo dyes, for example as described in GB 834,304, Example 3.

Preferred dyes of the Formula (4) are those in which:

$R^9$ is H or $C_{1-4}$-alkyl, especially H;

$R^{10}$ is H or optionally substituted $C_{1-6}$-alkyl, more preferably H or $C_{1-4}$-alkyl and especially H or methyl;

$R^{11}$ is an optionally substituted phenyl, more preferably phenyl substituted with carboxy, hydroxy or sulpho and especially phenyl substituted with one or preferably two sulpho groups;

each L independently is an optionally substituted $C_{1-6}$-alkylene group, more preferably a $C_{1-6}$-alkylene group and especially an alkylene group of the formula $-C_mH_{2m}-$, wherein m is an integer from 1 to 6, preferably 2 or 3; and each W independently is $-OR^9$, $-NR^{10}R^{11}$ or Cl, more preferably $-NR^{10}OR^{11}$ and especially $-NHR^{11}$.

The dyes of Formula (4) may be prepared by methods analogous to those described in the prior art for similar triphenodioxazine dyes, for example as described in EP 576 123 A1 on pages 6 to 8 and Example 1.

The cyan, yellow, magenta and black colorants present in the inks of the first set of inks may be selected from any of the colorants suitable for use in ink jet printers utilising the conventional CMYK colouring system for example, cyan, yellow, magenta and black pigments and dyes. Preferably the colorants present in the first set of inks are dyes, more preferably dyes which contain fibre reactive groups.

When any of the first set of inks contain a fibre reactive dye, any of the cyan, magenta, yellow and black reactive dyes listed in the Colour Index are suitable. Preferred reactive dyes comprise of one or more chromophores and one or more fibre reactive groups. Preferred fibre reactive groups are cellulose reactive groups, more preferably, vinylsulphone, sulphatoethylsulphone, halopyrimidine and holotriazine groups. Preferred halotriazine groups are fluoro and chlorotriazine groups, more preferably monochlorotriazine groups. Examples of suitable chromophores include azo, phthalocyanine, triphenodioxazine, anthraquinone and formazan chromophores. Especially preferred reactive dyes suitable for use in the first set of inks comprise one or more azo, phthalocyanine, triphenodioxazine, anthraquinone and formazan chromophore and one or more mono-chlorotriazine group. It is preferred that the reactive dye is water soluble.

Specific examples of reactive dyes suitable for use as colorants in the first set of inks include for example. Colour Index (C.I.) Reactive Red 31, C.I. Reactive Blue 71 and C.I. Reactive Black 8. These dyes are available from Zeneca Ltd.

In a preferred embodiment, the cyan colorant in the first set of inks is a dye of the Formula (5), or salt thereof Formula (5)

$$\text{CuPc} \begin{cases} (3\text{-}SO_3H)a \\ (3\text{-}SO_2NHCH_2CH_2NH\text{---}) \end{cases} \begin{array}{c} X \\ | \\ N \\ \diagdown \\ N \\ | \\ Z \end{array} )b$$

wherein:
Pc is a phthalocyanine nucleus;
Z is —$NR^{12}R^{13}$, —$OR^{13}$ or halogen; wherein
$R^{12}$ is H or optionally substituted alkyl;
$R^{13}$ is H, optionally substituted alkyl or optionally substituted aryl;
X is as hereinbefore defined;
a is 1 to 3;
b is 1 to 3; and
(a+b)=4.

It is preferred that $R^{12}$ is H or optionally substituted $C_{1-4}$-alkyl, more preferably H or $C_{1-4}$-alkyl and especially H.

Preferably $R^{13}$ is H, optionally substituted $C_{1-6}$-alkyl or optionally substituted phenyl, more preferably H or optionally substituted $C_{1-4}$-alkyl and especially methyl or ethyl.

When Z is halogen it is preferably chloro.

Preferably Z is a group of the formula —$NR^{12}R^{13}$ or —$OR^{13}$, more preferably —$NHR^{13}$ or —$OR^{13}$ and especially methoxy and ethoxy.

The dyes of Formula (5) may be prepared by methods analogous to those described in the art for similar phthalocyanine compounds. For example a suitable method is described in GB 805,562, Example 12.

In a preferred embodiment the yellow colorant present in the first set of inks is a dye of Formula (6) or salt thereof:

Preferably $R^{16}$ is H, optionally substituted $C_{1-4}$-alkyl or optionally substituted phenyl, more preferably H, $C_{1-4}$-alkyl or phenyl and especially H, methyl and ethyl.

When Y is halogen it is preferably chloro.

It is preferred that Y is a group of the formula —$NR^{15}R^{16}$, more preferably —$NHR^{16}$ and especially —$NH_2$.

The dyes of Formula (6) may be prepared by methods analogous to those described in the art for similar azo dyes. For example a suitable method is described in GB 1,271,226, Examples 2 to 153.

In a preferred embodiment, the magenta colorant present in the first set of inks is a dye of the formula (7) or salt thereof:

Formula (7)

wherein:
G is halogen or a group of the formula —$NR^{17}R^{18}$ or —$OR^{17}$, wherein $R^{17}$ is H or optionally substituted alkyl;
$R^{18}$ is H, optionally substituted aryl or optionally substituted alkyl;
$R^{19}$ and $R^{20}$ are each independently $C_{1-4}$-alkyl; and
X is as hereinbefore defined.

It is preferred that $R^{17}$ is H or optionally substituted $C_{1-4}$-alkyl, more preferably H or $C_{1-4}$-alkyl and especially H or methyl.

Preferably $R^{18}$ is H, optionally substituted phenyl or optionally substituted $C_{1-6}$-alkyl, more preferably H, $C_{1-6}$-alkyl or phenyl substituted by $C_{1-4}$-alkyl, —COOH or —$SO_3H$, especially $C_{1-6}$-alkyl and phenyl substituted by Formula (6)

wherein:
Y is a halogen or a group of the formula —$NR^{15}R^{16}$ or —$OR^{16}$, wherein $R^{15}$ is H or optionally substituted $C_{1-4}$-alkyl, and $R^{16}$ is H optionally substituted alkyl or aryl;
$R^{14}$ is H, optionally substituted alkyl or aryl; and
each X independently is as hereinbefore defined.

Preferably $R^{14}$ is H or optionally substituted $C_{1-4}$-alkyl, more preferably $C_{1-4}$-alkyl and especially methyl or ethyl.

Preferably $R^{15}$ is H or $C_{1-4}$-alkyl, more preferably H, methyl or ethyl and especially H.

methyl, ethyl or —$SO_3H$ and more especially phenyl substituted with —$SO_3H$ and methyl.

$R^{19}$ and $R^{20}$ are preferably independently methyl, ethyl or iso-propyl.

When G is halogen it is preferably chloro.

Preferably G is a group of the formula —$NR^{17}R^{18}$, more preferably —$NHR^{18}$.

The dyes of Formula (7) may be prepared using methods analogous to those described in the art for other azo dyes. For example a suitable method is described in WO94/22961.

A preferred black colorant present in the first set of inks is a 1:2 Chromium or Cobalt complex, or mixture thereof, of Formula (8) or salt thereof:

Formula (8)

[Chemical structure of Formula (8) showing an azo dye with M (Cr or Co) metal complex, with O₂N, HO₃S, SO₃H substituents and a triazine ring bearing X and T groups]

wherein:

T is halogen or a group of the formula —NR²¹R²² or —OR²¹, wherein

R²¹ is H or optionally substituted alkyl or optionally substituted aryl;

R²² is H or optionally substituted alkyl;

M is Cr or Co; and

X is as hereinbefore defined.

Preferably R²¹ is H, optionally substituted $C_{1-6}$-alkyl or optionally substituted phenyl, more preferably H or $C_{1-4}$-alkyl and especially H, methyl or ethyl.

Preferably R²² is H or $C_{1-4}$-alkyl, more preferably H.

When T is halogen it is preferably chloro.

It is preferred that T is a group of the formula —NR²¹R²², more preferably —NHR²¹.

Preferably a mixture of Cobalt and Chromium complexes of the dyes of Formula (8) are present in the black ink. Preferred mixtures comprise the components:

(a) from 50 to 95, more preferably from 55 to 80 and especially from 60 to 75 parts of the 1:2 chromium complex; and (b) from 5 to 50, more preferably 20 to 45 and especially 40 to 25 parts of the 1:2 cobalt complex, wherein all parts are by weight and the parts (a)+(b)=100.

The dye of Formula (8) and the complexes thereof may be prepared using methods analogous to those described in the art for similar azo dyes. For example, a suitable method is disclosed in GB 985,481, Examples 1 and 2.

A further preferred black colorant suitable for use in the first set of inks is a dye of the Formula (9) or a salt thereof.

wherein:

X is as hereinbefore defined; and

R²³ and R²⁴ are each independently H or optionally substituted alkyl.

Preferably R²³ and R²⁴ are each independently H or $C_{1-6}$-alkyl optionally substituted by —OH or SO₃H, more preferably H or $C_{1-4}$-alkyl and especially H.

The sulpho group on the phenyl ring is preferably attached at the para position relative the second sulpho group on the ring.

It is preferred that the dye of Formula (9) is mixed with a small quantity of a yellow and/or a red dye to give a neutral black shade.

A preferred mixture of dye comprises:

(a) from 50 to 95, more preferably from 60 to 80 parts of the dye of Formula (9);

(b) from 5 to 20, more preferably from 5 to 15 parts of a yellow dye; and (c) from 10 to 30, more preferably from 15 to 25 parts of a red dye;

wherein all parts are by weight and the sum of the parts (a), (b) and (c)=100. The red and yellow dyes which may be present in the mixture are preferably azo dyes, more preferably water-soluble azo dyes.

A preferred red dye is the dye of the hereinbefore defined Formula (3) wherein X is Cl and E is 2-methylphenylamino. A preferred yellow dye is the dye of the hereinbefore defined Formula (1) wherein X is Cl, A is 3-sulpho-N-methylaniline or 4-sulpho-N-methyl anilino and R¹ is amino.

An especially preferred yellow dye is a 1:1 mixture of the dyes comprising:

(i) a dye of Formula (1) in which X is Cl, A is 3-sulpho-N-methylanilino and R¹ is amino; and (ii) a dye of Formula (1) in which X is Cl, A is 4-sulpho-N-methylanilino and R¹ is amino.

In view of the foregoing preferences an especially preferred black colorant comprises:

(a) from 60 to 80 parts of the dye of Formula (10);

(b) from 15 to 25 parts of a 1:1 mixture of dyes of Formula (11); and

(c) from 5 to 15 parts of a red dye of Formula (12);

wherein all parts are by weight and the sum of the parts (a), (b) and (c)=100:

Formula (9)

[Chemical structure of Formula (9) showing a bis-azo naphthalene dye with SO₃H, NH₂, OH, HO₃S substituents and a triazine ring bearing X and NR²³R²⁴ groups]

Formula (10)

Formula (11)

Formula (12)

and
(7) condensing the product of stage (5) with a compound of the formula $NHR^{23}R^{24}$
  wherein X, $R^{23}$ and $R^{24}$ are as hereinbefore defined.

A further preferred magenta colorant suitable for use in the first set of inks is a dye of the Formula (13) or salt thereof:

Formula (13)

The dye of Formula (9) may be prepared using conventional methods for the preparation of azo dyes. For example a suitable method comprises:

(1) diazotising the aniline disulphonic acid of the formula:

(2) diazotising 2-amino-4-nitrobenzenesulphonic acid;
(3) coupling the product of stage (2) with 8-amino-1-naphthol-3,6-disulphonic acid under mildly alkaline conditions;
(4) coupling the product of stage (3) with the product of stage (1) under acidic conditions;
(5) reducing the nitro group on the product of stage (4), for example by hydrogenation over a palladium catalyst;
(6) condensing the product of stage (5) with the triazine compound of the formula:

wherein:
  Q is halogen or a group of the formula $—NR^{25}R^{26}$ or $—OR^{25}$, wherein
  $R^{25}$ is H or optionally substituted alkyl;
  $R^{26}$ is H, optionally substituted aryl or optionally substituted alkyl; and
  X is as hereinbefore defined.

It is preferred that $R^{25}$ is H or optionally substituted $C_{1-4}$-alkyl, more preferably H or $C_{1-4}$-alkyl and especially H or methyl.

Preferably $R^{26}$ is H, optionally substituted phenyl or optionally substituted $C_{1-6}$-alkyl, more preferably H, $C_{1-6}$-alkyl or phenyl substituted by $C_{1-4}$-alkyl, —COOH or —$SO_3H$, especially $C_{1-6}$-alkyl and phenyl substituted by methyl, ethyl or —$SO_3H$ and more especially phenyl substituted with —$SO_3H$ and —COOH.

When Q is halogen it is preferably chloro.

Preferably Q is a group of the formula —$NR^{25}R^{26}$, more preferably —$NHR^{26}$.

The dyes of Formula (13) may be prepared using methods analogous to those described in the art for other azo dyes. For example a suitable method is described in GB 899,376.

Although Formulae (1) to (13) show the dyes in their free acid form, it is intended that salts of the dyes are included within the scope of the present invention. Thus the inks may contain dyes in their free acid and/or salt forms.

In view of the foregoing preferences for the colorants for the first set of inks, in a particularly preferred embodiment, the first set of inks comprises an ink containing a dye of Formula (5), an ink containing a dye of Formula (6) an ink containing a dye of Formula (7) and an ink containing a dye of Formula (8) or a dye of Formula (9); and the second set of inks comprises an ink containing a dye of Formula (1), an ink containing a dye of Formula (2) an ink containing a dye of Formula (3) and an ink containing a dye of Formula (4).

The labile group or atom represented by X in the dyes of Formulae (1) to (9) is a group or atom which is bound directly to the triazine nucleus and which is readily displaced therefrom in mildly alkaline conditions. Preferred labile groups include for example, a sulphonic acid group; a thiocyano group; a quaternary ammonium group, for example a trialkyl ammonium group or an optionally substituted pyridinium group, for example 3- or 4-caboxypyridinium; —$OSO_3H$; or $CH_3COO$—.

Preferred labile atoms include halogens, more preferably F, Cl or Br and especially Cl.

When the substituents on the dyes of Formulae (1) to (13) are optionally substituted, preferred substituents are selected from —OH, —$SO_3H$, —COOH, —CN, —$NO_2$, —$PO_3H_2$, halogen, especially Cl or Br, $C_{1-4}$-alkyl and $C_{1-4}$-alkoxy.

It is preferred that the colorants/dyes present in the inks are purified prior to incorporation into the ink by removing substantially all of the inorganic salts and other by products which may be present in the colorant/dye. Suitable purification processes include reverse osmosis and/or ultrafiltration.

The inks used in the first and second set of inks of the present invention comprise the relevant colorant or dye and a medium. The inks may comprise a mixture of two or more different colorants or dyes, or salts thereof, to provide an ink composition of the desired colour for use as an ink of the first or second set of inks of the present invention.

The medium for the ink compositions may be a liquid or a low melting point solid. Liquid media may be aqueous or solvent-based.

It is preferred that when dyes are used in the inks they are dissolved completely in the aqueous or solvent medium to form a solution.

Preferred inks are those comprising a dye, preferably a dye of the Formula (1) to (9) as hereinbefore defined and an aqueous medium.

The inks used in the method of the present invention preferably contain from 0.5% to 20%, more preferably from 0.5% to 15%, and especially from 2% to 12% by weight of the dye/colorant based on the total weight of the ink It is preferred that where the colorant is a dye, it has a solubility of around 10% or more to allow the preparation of concentrates which may be used to prepare more dilute inks and to minimise the chance of precipitation of the dye if evaporation of the liquid medium occurs during use of the ink.

Where the colorant is a dye its solubility can be enhanced by converting the sodium salt, in which form it is usually synthesised, either partially or wholly, into the lithium or ammonium salt Purification of the dye can be conveniently accomplished by use of membrane separation processes to separate unwanted by-products and inorganic materials from the solution or dispersion of the dye, followed by partial or complete exchange of the counter ion.

Where the liquid medium is aqueous based it is preferably water or a mixture of water and one or more water-soluble organic solvent. The weight ratio of water to organic solvent (s) is preferably from 99:1 to 1:99, more preferably from 95:1 to 50:50 and especially from 90:10 to 60:40.

The water-soluble organic solvent is preferably selected from $C_{1-4}$-alkanols such as methanol, ethanol, n-propanol, isopropanol, n-butanol, sec-butanol, tert-butanol or isobutanol; amides such as dimethylformamide or dimethylacetamide; ketones or ketone-alcohols such as acetone or diacetone alcohol; ethers such as tetrahydrofuran or dioxane; oligo- or poly-alkylene glycols such as diethylene glycols, triethylene glycol, polyethylene glycol or polypropylene glycol; alkenyleneglycols or thioglycols containing a $C_2$-$C_6$-alkylene group such as ethylene glycol, propylene glycol, butylene glycol, pentylene glycol or hexylene glycol, thioglycol and thiodiglycol; polyols such as glycerol or 1,2,6-hexanetriol; $C_{1-4}$-alkyl-ethers or polyhdric alcohols such as 2-methoxyethanol, 2-2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol; heterocyclic ketones, such as 2-pyrrolidone and N-methyl-2-pyrrolidone; or mixtures containing two or more of the aforementioned water-soluble organic solvents for example thiodiglycol and a second glycol or diethylene glycol and 2-pyrrolidone.

Preferred water-soluble organic solvents are 2-pyrrolidone; N-methylpyrrolidone; alkylene glycols and oligo-alkylene glycols, such as ethylene glycol, diethylene glycol, triethylene glycol; and lower alkyl ethers of polyhydric alcohols such as 2-methoxy-2-ethoxy-2-ethoxy-ethanol; polyethylene glycols with a molecular weight of up to 500; and thioglycols such as thiodiglycols. A preferred specific solvent mixture is a binary or ternary mixture of water and diethylene glycol and/or, 2-pyrrolidone or N-methylpyrrolidone in weight ratios 75-95:25-5 and 60-98:1-20:1-20 respectively. An especially preferred specific solvent mixture is a binary or tertiary mixture of water and thiodiglycol and/or 2-pyrrolidone or N-methylpyrrolidone in weight ratios 75-98:25-2 and 60-90:5-20:5-20 respectively.

Examples of suitable aqueous ink media are given in U.S. Pat. Nos. 4,963,189, 4,703,113, 4,626,284, EP 4,251,50A and U.S. Pat. No. 5,207,824.

When aqueous inks are used in the present invention, they preferably also contain a humectant to inhibit evaporation of water and a preservative to inhibit the growth of fungi, bacteria and/or algae in the solution. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the ink is preferably free from such compounds Where the liquid medium is solvent based the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred solvents include ketones, especially methyl ethyl ketone and alkanols especially ethanol and n-propanol.

Solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 125° C. Suitable low melting point solids include long chain fatty acids or alcohols, preferably those with $C_{18-24}$ chains, or sulphonamides. The dye or colorant may be dissolved in the low melting point solid or may be finely dispersed in it.

The inks may optionally contain other components conventionally used in inks for ink jet printing. For example, viscosity and surface tension modifiers, corrosion inhibitors, kogation reducing additives, surfactants and anti-cockle agents, for example those disclosed in U.S. Pat. No. 5,207,824, column 3, line 13 to column 4, line 21, which is included herein by reference thereto.

If desired, the inks may be buffered to a pH of from 5 to 8, more preferably from 6 to 7, with a suitable buffer such as the sodium salt of metanillic acid or an alkali metal phosphate.

Where the ink jet printing technique involves the charging and electrically-controlled deflection of drops, for example in a continuous ink jet printer, the inks preferably also contain a conducting material such as an ionised salt to enhance and stabilise the charge applied to the drops. Suitable salts for this purpose are alkali metal salts of mineral acids.

In view of the foregoing preferences, a particularly preferred ink composition is an aqueous ink comprising the components:

(a) 0.5 to 20 parts of the relevant dye;

(b) 50 to 98 parts water; and (c) 2 to 50 parts water soluble organic solvent;

wherein all parts are parts by weight and the parts (a)+(b)+(c)=100. In addition to the components (a), (b) and (c), the ink may also contain further components as hereinbefore mentioned.

The ink jet printer used for the application of the inks to the substrate forms each ink into small droplets by ejection from a reservoir through a small orifice (the ink jet nozzle) so that the ink droplets are directed at the substrate during relative movement between the substrate and the reservoir. This process is commonly referred to as ink jet printing. The ink may be applied to the substrate using a "continuous" or a "drop on demand" printer, both of which are well known in the art. Continuous ink jet printers produce a stream of ink from the ink jet nozzle which is formed into droplets and directed to the substrate via a suitable control means. Drop on demand printers eject individual droplets of ink from the ink jet nozzle in response to a control signal. Preferred drop on demand ink jet printers for use in the present invention are piezoelectric and thermal ink jet printers. In thermal ink jet printing, programmed pulses of heat are applied to the ink in the reservoir by means of a resistor adjacent to the ink jet nozzle. In piezo-electric printers ink droplets are ejected from the ink jet nozzle using a piezoelectric transducer. The transducer oscillates in response to an electrical control signal, thereby creating a pressure wave in the reservoir adjacent to the ink jet nozzle which ejects droplets of ink from the nozzle.

Ink jet printers suitable for use in the present invention apply at least one ink from the first set of inks and at least one ink from the second set of inks, wherein the first and second sets of inks are as hereinbefore defined.

Preferably the ink jet printer applies a first set of inks consisting of black, cyan, magenta and yellow inks and from one to four, preferably from two to four and especially four of the hereinbefore defined inks of the second set of inks.

Ink jet printers suitable for use in the present invention require a means to access each of the inks comprising the first and second sets of inks, for example from separate ink tanks containing each ink.

Preferably the inks comprising the first and second set of inks are contained in an ink cartridge suitable for use in an ink jet printer. The ink cartridge preferably comprises a container in which are held the first and second set of inks. Preferably the ink jet printer contains the ink cartridge, for example within a suitable housing in the printer.

It is preferred that the printer has a separate channel to direct each ink colour in the first and second set of inks to a nozzle, or array of nozzles, dedicated to that ink colour. The separate ink channels for each ink colour avoids cross contamination of inks in the ink jet head which could result in an undesirable colour on the printed substrate. Accordingly, preferred ink jet printers have from 5 to 8, more preferably from 6 to 8 and especially 8 ink channels. An example of an ink jet printer suitable for use in the present invention is described in EP 616 893 A2.

The substrate used in the ink-jet method of the present invention may be paper, plastics, textile, metal, ceramic or glass and is preferably paper, plastic or a textile material, especially a natural, semi-synthetic or synthetic material.

Examples of natural textile materials include wool, silk, hair and cellulosic materials, particularly cotton, jute, hemp, flax and linen.

Examples of synthetic and semi-synthetic materials include polyamides, polyesters, polyacrylonitriles and polyurethanes.

Preferred substrates include overhead projector slides paper and textile materials. Preferred papers include plain and treated papers. Preferred textile materials are cellulosic materials such as cotton. Especially preferred substrates are treated papers suitable for high resolution "photo-realistic" image printing and cellulosic textile materials.

According to a second aspect of the present invention there is provided a set of ink jet printing inks comprising a first and second set of inks wherein:

(a) the first set of inks consists of a yellow ink, a magenta ink, a cyan ink and optionally a black ink; and (b) the second set of inks comprises one or more inks selected from:

an ink containing a dye of Formula (1) or salt thereof;

an ink containing a dye of the Formula (2) or a salt thereof;

an ink containing a dye of Formula (3) or a salt thereof; and an ink containing a dye of Formula (4) or a salt thereof;

wherein the dyes of Formulae (1), (2), (3) and (4) are as hereinbefore defined in the first aspect of the present invention.

Preferred inks in the set according to the second aspect of the present invention are as defined in the first aspect of the present invention.

Accordingly a preferred set of ink jet printing inks comprises:

(a) a first set of inks consisting of:
  a cyan ink containing a dye of the Formula (5);
  a yellow ink containing a dye of Formula (6);
  a magenta ink containing a dye of the Formula (7) or Formula (13); and
  a black ink containing a dye of the Formula (8) or Formula (9); and
(b) a second set of inks comprising from one to four, preferably from two to four and especially four inks selected from:
  an ink containing a dye of Formula (1);
  an ink containing a dye of Formula (2);
  an ink containing a dye of Formula (3);and
  an ink containing a dye of Formula (4).

According to a third aspect of the present invention there is provided a paper or an overhead projector slide, a metal, glass or ceramic substrate or textile material coloured by means of the method according to the first aspect of the present invention.

According to a fourth aspect of the present invention there is provided a process for the coloration of a textile material using ink-jet printing which comprises the steps:
  i) applying to the textile material by ink-jet printing the inks from the first and second sets of ink in accordance with the method of the first aspect of the present invention; and
  ii) heating the textile material at a temperature from 50° C. to 250° C. to fix the dyes and colorants on the material.

The process for coloration of a textile material by ink-jet printing preferably comprises a pre-treatment of the textile material with an aqueous pretreatment composition comprising a water-soluble base, a hydrotropic agent and a thickening agent followed by removing water from the pre-treated textile material to give a dry pre-treated textile material which is subjected to ink-jet printing in step i) above.

The pre-treatment composition preferably comprises a solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pre-treatment to promote the dyeing of the pre-treated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mPa.s, preferably from 10 to 100 mPa.s, (measured on a Brookfield RVF Viscometer). For an alginate thickener this range can be provided by using from 10% to 20% by weight based on the total weight of the pretreatment composition.

The remainder of the pre-treatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents include cationic polymers and quaternary ammonium compounds. Suitable cationic polymers include for example, a 50% aqueous solution of a dicyanamide/phenol formaldehydelammonium chloride condensate e.g. MATEXIL FC-PN (available from ICI), which have a strong affinity for the textile material and the dye and thus increase the fixation of the dye on the textile material. Suitable quaternary ammonium compounds include for example those described in our EP 534 660 A1, incorporated herein by reference thereto, such as distearyl dimethylammonium chloride.

Examples of anti-migration agents are low molecular weight acrylic resins, e.g. polyacrylates, such as poly(acrylic acid) and poly(vinyl acrylate).

In the pre-treatment stage of the present process the pre-treatment composition is preferably evenly applied to the textile material. Where a deeply penetrated print or a deep shade is required the pretreatment composition is preferably applied by a padding or similar process so that it is evenly distributed throughout the material. However, where only a superficial print is required the pre-treatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, is as hereinbefore defined for the coloration method of the first aspect of the present invention. It is preferred that each ink of the first set of inks contains a reactive dye.

After application of the ink, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes. If a steam (wet) heat treatment is used, the printed material is preferably maintained at 100–105° C. for from 5 to 15 minutes whereas if a dry heat treatment is employed the printed material is preferably maintained at 140–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

According to a fifth aspect of the present invention there are provided textile materials, especially cellulosic textile materials, coloured by means of the process according to the fourth aspect of present invention.

According to a sixth aspect of the present invention there is provided a photorealistic print prepared using the coloration method according to the first aspect of the present invention.

A photorealistic print is a high resolution print which reproduces an image from digital data corresponding to that image. The photorealistic prints prepared in accordance with the present invention exhibit excellent colour yield and a wide colour gamut compared with images formed by conventional CMYK ink jet printers.

Examples of systems which prepare images in digitised form include digital cameras, images stored on a CD ROM system, images that have been digitised using an optical scanning device and computer graphics programs such as CAD/CAM systems.

The digital data corresponding to the image is used by a computer to control the discharge of inks selected from the first and second sets of ink from an ink jet printer in accordance with the coloration method of the first aspect of the present invention, thereby providing a photorealistic print corresponding to the digitised image on a substrate.

The substrate used in the preparation of photorealistic prints may be any of the hereinbefore mentioned substrates. However, preferred substrates are paper, more preferably coated paper. Examples of paper and coated paper substrates suitable for use in the preparation of photorealistic prints include Hewlett Packard coated papers such as HP 516347, HP Premium Coated Paper and HP Photopaper, Stylus Pro 720 dpi Coated Paper, Epson Photo Quality Glossy Film (available from Seiko Epson Corp.), Epson Photo Quality Glossy Paper (available from Seiko Epson Corp.) Canon HR 101 High Resolution Paper (available from Canon), Canon GP 201 Glossy Paper (available from Canon), and Canon HG 101 High Gloss Film (available from Canon).

Figure 1:
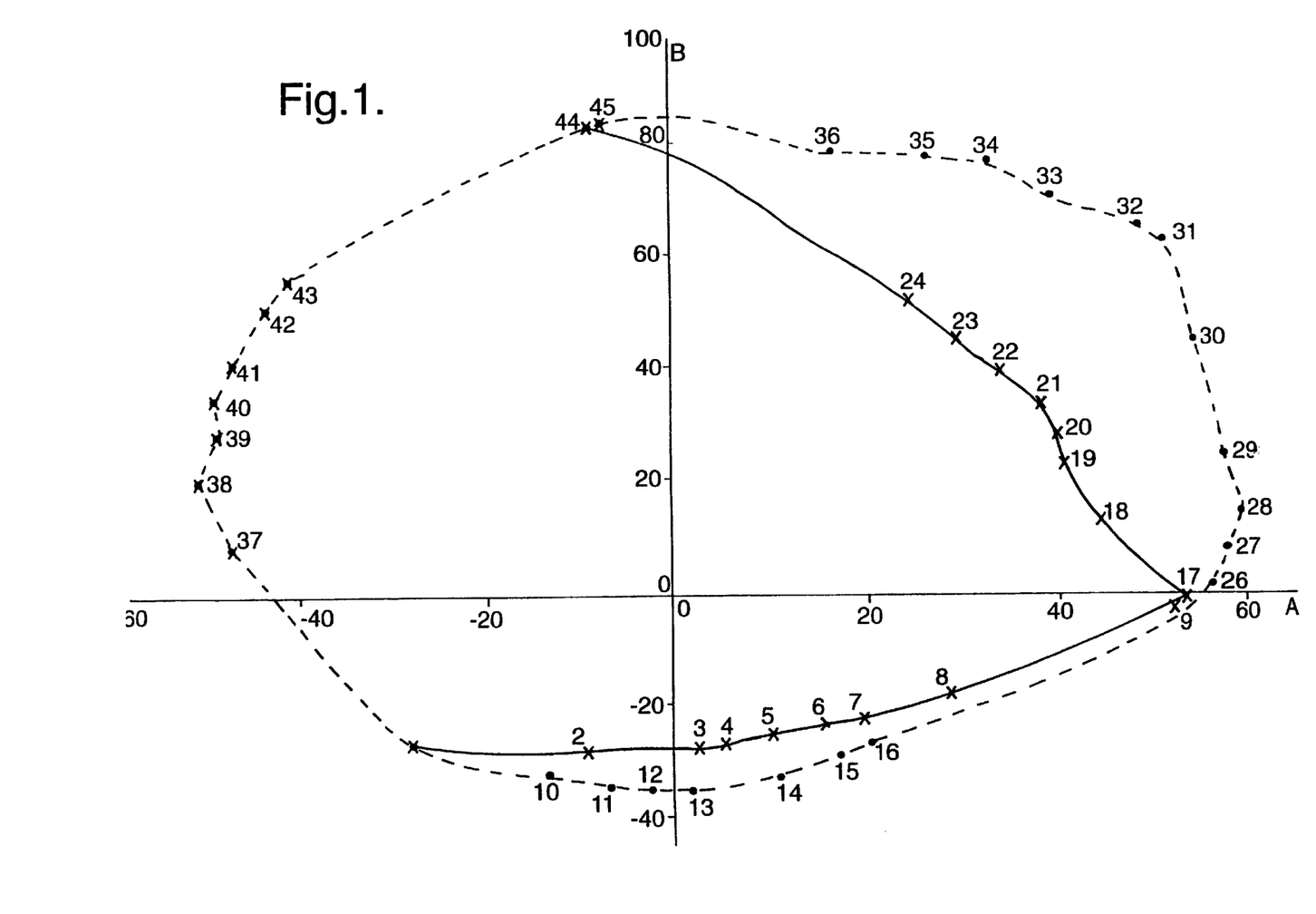
FIG. 1 compares the colour gamut obtained using a first set of inks alone (i.e. cyan, magenta and yellow) with that obtained using a first and second set of inks according to the present invention.

The present invention is further illustrated by the following examples and by reference to FIG. 1.

Ink Compositions Suitable for use in the Present Invention

EXAMPLE 1

Golden yellow ink compositions containing a mixture of dyes of Formula (1) wherein:

$R^1$ is —$NH_2$;

X is Cl; and

A is a mixture of N-methyl-3sulphoanilino and N-methyl4-sulphoanilino; were made according to each of the formulations shown in Tables I and 11 wherein figures denote parts by weight for each component. The column marked "dye content" in Tables (I) and (II) refers to the parts by weight of the dye of Formula (1).

Each ink was prepared by first purifying the dye mixture of Formula (1) by desalination using reverse osmosis and ultrafiltration. The purified dye was then added to a mixture of the other components comprising that ink formulation and was stirred to form a solution. The ink was then filtered using a 0.45 micron filter to remove any particulate matter that may have been present in the ink.

The following abbreviations are used:

PG=propylene glycol

DEG=diethylene glycol

NMP=N-methyl pyrollidone

DMK=dimethylketone

IPA=isopropanol

MEOH-methanol

2P=2-pyrollidone

MIBK=methylisobutyl ketone

P12=propane-1,2-diol

BDL butane=2,3-diol

CET=cetyl ammonium bromide

PHO=$Na_2HPO_4$ and

TBT=tertiary butanol

TDG=thiodiglycol

TABLE I

| Ink No. | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | 0.2 | | | | | |
| 3 | 10.0 | 85 | 5 | | 2 | 2 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 7 | 2.5 | 60 | 4 | 15 | 3 | 3 | | | 6 | 10 | 5 | 4 |
| 8 | 5 | 65 | | 20 | | | | | 10 | | | |
| 9 | 2.4 | 75 | 5 | 4 | | 5 | | | | 6 | | 5 |
| 10 | 4.1 | 80 | 3 | 5 | 2 | 10 | | 0.3 | | | | |
| 11 | 3.2 | 65 | | 5 | 4 | 6 | | | 5 | 4 | 6 | 5 |
| 12 | 5.1 | 96 | | | | | | | | 4 | | |
| 13 | 10.8 | 90 | 5 | | | | | | 5 | | | |
| 14 | 10.0 | 80 | 2 | 6 | 2 | 5 | | | 1 | | 4 | |
| 15 | 1.8 | 80 | | 5 | | | | | | | 15 | |
| 16 | 2.6 | 84 | | | 11 | | | | | | 5 | |
| 17 | 3.3 | 80 | 2 | | | 10 | | | | 2 | | 6 |
| 18 | 12.0 | 90 | | | 7 | | 0.3 | | 3 | | | |
| 19 | 5.4 | 69 | 2 | 20 | 2 | 1 | | | | | 3 | 3 |
| 20 | 6.0 | 91 | | | 4 | | | | | | 5 | |

TABLE II

| Ink No. | Dye Content | Water | PG | DEG | NMP | CET | TBT | TDG | BDL | PHO | 2P | P12 |
|---|---|---|---|---|---|---|---|---|---|---|---|---|
| 21 | 3.0 | 80 | 15 | | | 0.2 | | | | | 5 | |
| 22 | 9.0 | 90 | | 5 | | | | | | 1.2 | | 5 |
| 23 | 1.5 | 85 | 5 | 5 | | 0.15 | 5.0 | 0.2 | | | | |
| 24 | 2.5 | 90 | | | 6 | 4 | | | | 0.12 | | |
| 25 | 3.1 | 82 | 4 | 8 | | 0.3 | | | | | | 6 |
| 26 | 0.9 | 85 | | 10 | | | | | 5 | 0.2 | | |
| 27 | 8.0 | 90 | | 5 | 5 | | | 0.3 | | | | |
| 28 | 5.0 | 70 | | 10 | 4 | | | | 1 | | 4 | 11 |
| 29 | 2.2 | 75 | 4 | 10 | 3 | | | | 2 | | 6 | |
| 30 | 10.0 | 91 | | | 6 | | | | | | 3 | |
| 31 | 9.0 | 76 | | 9 | 7 | | 3.0 | | | 0.95 | 5 | |
| 32 | 5.0 | 78 | 5 | 11 | | | | | | | 6 | |
| 33 | 5.4 | 86 | | | 7 | | | | | | 7 | |
| 34 | 2.1 | 70 | 5 | 5 | 5 | 0.1 | 0.2 | 0.1 | 5 | 0.1 | 5 | |
| 35 | 2.0 | 90 | | 10 | | | | | | | | |
| 36 | 2 | 88 | | | | | | 10 | | | | |
| 37 | 5 | 78 | | | 5 | | | 12 | | | 5 | |
| 38 | 8 | 70 | 2 | | 8 | | | 15 | | | 5 | |
| 39 | 10 | 80 | | | | | | 8 | | | 12 | |
| 40 | 10 | 80 | | 10 | | | | | | | | |

EXAMPLE 2

Orange inks according to each of the formulations shown in Tables (I) and (II) were prepared using a dye of Formula (2) wherein:

$R^4$ is —$CH_3$;

B is —$NH_2$; and

X is Cl.

The inks were prepared by first purifying the dye and mixing the components of each formulation as in Example 1.

EXAMPLE 3

Red inks according to each of the formulations shown in Tables (I) and (II) were prepared using a dye of Formula (3) wherein:

E is 2-methylanilino; and

X is Cl.

The inks were prepared by first purifying the dye and mixing the components of each formulation as in Example 1.

EXAMPLE 4

Blue inks according to each of the formulations shown in Tables (I) and (II) were prepared using a dye of Formula (4) wherein:

each W is 2,4-disulphoanilino;

each L is —$CH_2CH_2$—; and each X is Cl.

The inks were prepared by first purifying the dye and mixing the components of each formulation as in Example 1.

EXAMPLE 5

Cyan inks according to each of the formulations shown in Tables (I) and (II) were prepared using a dye of Formula (5) wherein:

Z is methoxy;

X is Cl;

a=2.7 and b=1.3.

The inks were prepared by first purifying the dye and mixing the components of each formulation as in Example 1.

EXAMPLE 6

Yellow inks according to each of the formulations shown in Tables (I) and (II) were prepared using a dye of Formula (6) wherein:

Y is $NH_2$;

$R^{14}$ is ethyl;

and each X is Cl.

The inks were prepared by first purifying the dye and mixing the components of each formulation as in Example 1.

EXAMPLE 7

Magenta inks according to each of the formulations shown in Tables (I) and (II) were prepared using a dye of Formula (7) wherein:

G is 4-methyl-2-sulphoanilino;

$R^{19}$ and $R^{20}$ are methyl; and

X is Cl.

The inks were prepared by first purifying the dye and mixing the components of each formulation as in Example 1.

EXAMPLE 8

Black inks according to each of the formulations shown in Tables (I) and (II) were prepared using a dye of Formula (8) which comprises a mixture of 1:2 complexes of Cr and Co with the dye of Formula (8) wherein:

T is $NH_2$; and

X is Cl;

said mixture comprising 70 parts of the 1:2 Cr complex and 30 parts of the 1:2 Co complex with the dye of Formula (8).

The inks were prepared by first purifying the dye mixture and mixing the components of each formulation as in Example 1.

EXAMPLE 9

Magenta inks according to each of the formulations shown in Tables (I) and (II) were prepared using a dye of Formula (13) wherein:

X is Cl; and

Q is 2-carboxy-4-sulphoanilino.

The inks were prepared by first purifying the dye and mixing the components of each formulation as in Example 1.

EXAMPLE 10

The ink combinations shown in Table III may be applied to a paper substrate using an ink jet printer to achieve a wide colour gamut. In Table III, the Inks A to H correspond to ink formulation number 36 shown in Table II of Examples 1 to 8 respectively (i.e. 10 parts diethylene glycol, 88 parts water and 2 parts of the relevant dye).

TABLE III

| | First Set of Inks | | | | Second Set of Inks | | | |
|---|---|---|---|---|---|---|---|---|
| Combination No. | Ink A (golden yellow) | Ink B (orange) | Ink C (red) | Ink D (blue) | Ink E (cyan) | Ink F (yellow) | Ink G (magenta) | Ink H (black) |
| 1 | x | x | x | x | x | x | x | x |
| 2 | x | x | x | x | x | x | x | |
| 3 | x | x | | | x | x | x | x |
| 4 | | | x | x | x | x | x | x |
| 5 | | x | x | x | x | x | x | x |
| 6 | x | | x | | x | x | x | x |
| 7 | | x | | x | x | x | x | |
| 8 | | | x | | x | x | x | |
| 9 | | x | x | | x | x | x | |
| 10 | x | | | x | x | | | x |

EXAMPLE 11

The ink combinations shown in Table III may be applied to a textile material such as viscose rayon or cotton using ink formulation 40 in Table II of Examples 1 to 8 for the inks A to H respectively. Preferably the textile is pre-treated with a composition comprising:

2.5 pts sodium bicarbonate;

15 pts of a 10% aqueous solution of sodium alginate thickening agent;

15 pts of urea;

47.5 pts of water; and 20 parts of Composition A shown in Table IV.

TABLE IV

| Composition A | |
|---|---|
| Component | Parts by Weight |
| Urea | 25 |
| Distearyl Dimethyl Ammonium Chloride | 2.3 |
| Isopropyl Alcohol | 0.8 |
| Castor Oil + 2.5 Ethylene Oxide | 2.2 |
| Castor Oil + 4.0 Ethylene Oxide | 0.36 |
| Sodium Lauryl Sulphate | 0.010 |
| Methanol | 0.007 |
| Formaldehyde | 0.0001 |
| Tallow Amine + 15 Ethylene Oxide | 0.25 |
| Acetic Acid (80%) | 0.05 |
| Water | 69.0 |

The textile material should be thoroughly soaked with the pretreatment composition in a padding bath and the excess liquor removed by mangling. The material should then be dried in hot air, for example at a temperature of 90 to 120° C. prior to application of the inks shown in Table III by an ink jet printer.

EXAMPLE 12

Textile Printing with a Conventional Set of Inks Containing Dyes Selected From Magenta, Cyan and Yellow Only The colour gamut which can be achieved using inks containing one or more dyes selected from magenta, yellow and cyan (i.e. a first set of inks) was measured by ink jet printing the inks shown in Table (v) onto a Mercerised cotton substrate using a Hewlett Packard HP-560 ink jet printer. After printing the cotton was steamed for 8 minutes at 102° C. and a relative humidity of 100%.

The prints were then washed as follows:

(a) a cold rinse in water at ambient temperature;

(b) a 5 minute rinse in water containing an anionic soap at 90° C.; and (c) a final cold rinse in water at ambient temperature.

In Table (v) each ink comprises the parts by weight of each of the dyes shown dissolved in (100-no. of dye parts) parts of an ink medium comprising 90 parts water and 10 parts diethylene glycol.

In Table (v) the following cyan, magenta and yellow dyes were used:

The dye marked "Cyan" in Table (v) was of the structure:

The dye marked "Magenta (1)" in Table (v) was of the structure:

The dye marked "Magenta (2)" in Table (v) was of the structure:

The dye marked "Yellow" in Table (v) was of the structure:

All of the above dyes are available from Zeneca Limited.

After printing and washing the colour co-ordinates of each of the prints was measured using a CIE ANLAB at a 10° observer angle with a D65 illuminant. The resulting colour co-ordinates are shown in Table (vi).

In FIG. 1 the colour gamut achieved using inks with these conventional cyan, magenta and yellow inks is shown as the points marked x. In FIG. 1 the number next to each point corresponds with the print number shown in Tables (v) and (vi) above.

TABLE (V)

| Print No | Cyan | Magenta 1 | Magenta 2 | Yellow |
|---|---|---|---|---|
| 1 | 4 | | | |
| 2 | 3.5 | 0.625 | | |
| 3 | 3 | 1.25 | | |
| 4 | 2.5 | 1.875 | | |
| 5 | 2 | 2.5 | | |
| 6 | 1.5 | 3.125 | | |
| 7 | 1 | 3.75 | | |
| 8 | 0.5 | 4.37 | | |
| 9 | 0 | 5 | | |
| 17 | | | 5 | |
| 18 | | 4.37 | | 0.937 |
| 19 | | 3.75 | | 1.875 |
| 20 | | 3.12 | | 2.813 |
| 21 | | 2.5 | | 3.75 |
| 22 | | 1.87 | | 4.69 |
| 23 | | 1.25 | | 5.62 |
| 24 | | 0.625 | | 6.56 |
| 25 | | | | 7.5 |
| 37 | 3.5 | | | 0.937 |
| 38 | 3 | | | 1.875 |
| 39 | 2.5 | | | 2.812 |
| 40 | 2 | | | 3.75 |
| 41 | 1.5 | | | 4.687 |
| 42 | 1 | | | 5.625 |
| 43 | 0.5 | | | 6.562 |
| 44 | | | | 7.5 |

TABLE (VI)

Table (VI): Colour Space Coordinates for Prints on Cotton (First set of inks only)

| Print Number | Colour Space Coordinates | | | | | |
|---|---|---|---|---|---|---|
| | L | a | b | c | H | Integ |
| 1 | 57.882 | 29.238 | −26.7 | 39.591 | 222.4 | 3.58 |
| 2 | 48.325 | −9.218 | −28.76 | 30.197 | 252.23 | 4.5 |
| 3 | 41.266 | 2.262 | −28.59 | 28.679 | 274.52 | 6.12 |
| 4 | 42.24 | 5.36 | −26.9 | 27.425 | 281.27 | 5.33 |
| 5 | 39.697 | 9.89 | −25.68 | 27.515 | 291.07 | 6.18 |
| 6 | 38.388 | 15.708 | −24.31 | 28.943 | 302.87 | 6.68 |
| 7 | 36.221 | 19.693 | −23.1 | 30.352 | 310.45 | 8.02 |
| 8 | 37.222 | 28.682 | −18.16 | 33.949 | 327.66 | 7.95 |
| 9 | 39.704 | 52.573 | −4.898 | 52.801 | 354.68 | 12.53 |
| 17 | 25.725 | 20.455 | −27.91 | 34.605 | 306.23 | 13.36 |
| 18 | 42.092 | 44.648 | 12.245 | 46.296 | 15.336 | 11.23 |
| 19 | 44.08 | 40.872 | 21.103 | 45.998 | 27.308 | 11.5 |
| 20 | 44.851 | 40.286 | 26.622 | 48.287 | 33.458 | 12.93 |
| 21 | 46.562 | 38.18 | 32.326 | 50.027 | 40.254 | 14.09 |
| 22 | 49.763 | 33.989 | 39.258 | 51.928 | 49.114 | 14.81 |
| 23 | 53.373 | 29.203 | 44.361 | 53.11 | 56.644 | 14.23 |
| 24 | 57.212 | 23.832 | 51.146 | 56.426 | 65.016 | 14.79 |
| 25 | 78.356 | −9.152 | 82.771 | 83.276 | 96.31 | 14.36 |
| 36 | 69.882 | 16.112 | 77.854 | 79.504 | 78.307 | 14.94 |
| 37 | 54.814 | −47.13 | 8.759 | 47.935 | 169.47 | 5.51 |
| 38 | 54.771 | −50.6 | 21.036 | 54.794 | 157.42 | 7.64 |
| 39 | 55.107 | −48.75 | 28.337 | 56.384 | 149.83 | 8.54 |
| 40 | 57.293 | −48.99 | 35.586 | 60.553 | 144.01 | 9.48 |
| 41 | 58.559 | −46.84 | 41.751 | 62.745 | 138.29 | 10.81 |
| 42 | 62.958 | −43.12 | 51.078 | 66.842 | 130.17 | 11.37 |
| 43 | 63.602 | −41.01 | 56.238 | 69.639 | 126.08 | 14.05 |
| 44 | 78.361 | −7.98 | 82.837 | 83.22 | 95.502 | 13.96 |

EXAMPLE 13

Ink Jet Printing onto Cotton Using a First and Second Set of Inks

To illustrate the increase in colour gamut achieved using a first and a second set of inks the method according to the present invention was simulated by ink jet printing cotton substrates with each of the inks shown in Table (vii). In Table (vii) the column marked "first set" refers to the same cyan, magenta and yellow dyes used in Example 12. The column marked "second set" refers to dyes of the hereinbefore defined Formula (1) to (4).

Each ink in Table (vii) comprised the number of parts of the relevant dye(s) dissolved in a medium comprising a mixture of 10 parts diethylene glycol and 90 parts water. For example print 16 in Table (vii) comprised 3.75 parts of magenta (2), 2 parts of dye (1) (blue) and 94.25 parts of the ink medium (90:10 water: diethylene glycol).

Dye (1) was a blue dye of the hereinbefore defined Formula (5) with the structure:

Dye (1)

Dye (2) was a red dye of the hereinbefore defined Formula (3) with the structure:

Dye (2)

Dye (3)

Dye (3) was an orange dye of the hereinbefore defined Formula (2) with the structure:

Dye (4) was a golden yellow dye of the hereinbefore defined Formula (1) with the structure:

Dye (4)

(As an approximately 1:1 mixture of isomers)

The colour space coordinates obtained from the cotton printed with these inks is shown in Table (viii).

The colour gamut obtained from the inks containing the cyan, magenta and yellow dyes together with dyes (1) to (4) is shown by the points marked ●. The number next to each data point is the print number shown in Tables (vii) and (viii).

FIG. 1 clearly shows the dramatic increase in the colour gamut obtained when a first and second set of inks are used compared with ink jet printing using conventional cyan, magenta and red inks in Example 12.

As mentioned above Example 13 is a simulation of the method according to the present invention. When using the method according to this invention the inks jet printer would have, for example, eight ink channels; four containing the cyan magenta, yellow and optional black inks of the first set and four channels for the second set of inks containing dyes (1), (2), (3) and (4). To achieve a particular colour at a point on the substrate the printer control system applies the required mixture of inks from the first and second set of ink to that point.

TABLE VII

| | Dye Parts | | | | | | | |
|---|---|---|---|---|---|---|---|---|
| | First Set | | | | Second Set | | | |
| Print No. | Cyan | Magenta (1) | Magenta (2) | Yellow | Dye (1) | Dye (2) | Dye (3) | Dye (4) |
| 1 | 4 | | | | | | | |
| 2 | 3.5 | 0.625 | | | | | | |
| 3 | 3 | 1.25 | | | | | | |
| 4 | 2.5 | 1.875 | | | | | | |
| 5 | 2 | 2.5 | | | | | | |
| 6 | 1.5 | 3.125 | | | | | | |
| 7 | 1 | 3.75 | | | | | | |
| 8 | 0.5 | 4.37 | | | | | | |
| 9 | 0 | | | | | | | |
| 10 | 3 | | | | 1 | | | |
| 11 | 2 | | | | 2 | | | |
| 12 | 1 | | | | 3 | | | |
| 13 | | | | | 4 | | | |
| 14 | | | 1.25 | | 3 | | | |
| 15 | | | 2.5 | | 2 | | | |
| 16 | | | 3.75 | | 2 | | | |
| 17 | | | 5 | | | | | |
| 18 | | 4.37 | | 0.937 | | | | |
| 19 | | 3.75 | | 1.875 | | | | |
| 20 | | 3.12 | | 2.813 | | | | |
| 21 | | 2.5 | | 3.75 | | | | |
| 22 | | 1.87 | | 4.69 | | | | |
| 23 | | 1.25 | | 5.62 | | | | |
| 24 | | 0.625 | | 6.56 | | | | |
| 25 | | | | 7.5 | | | | |
| 26 | | | 3 | | 1 | | | |
| 27 | | | 1 | | 3 | 1 | | |
| 28 | | | | | 5 | 3 | 1 | |
| 29 | | | | | 3 | 5 | 3 | |
| 30 | | | | | 1 | 3 | 5 | |
| 31 | | | | | | 1 | 3 | |
| 32 | | | | | | | | |
| 32 | | | | | | | | |
| 33 | | | | | | | | |
| 34 | | | | | | | | |
| 35 | | | | 2.5 | | | | |
| 36 | | | | 5 | | | | |
| 37 | 3.5 | | | 0.937 | | | | |
| 38 | 3 | | | 1.875 | | | | |
| 39 | 2.5 | | | 2.812 | | | | |
| 40 | 2 | | | 3.75 | | | | |
| 41 | 1.5 | | | 4.687 | | | | |
| 42 | 1 | | | 5.625 | | | | |
| 43 | 0.5 | | | 6.562 | | | | |
| 44 | | | | 7.5 | | | | |

TABLE (viii)

Colour Space Coordinates for Prints on Cotton Using a First and Second Set of Inks

| Print No. | L | a | b | c | H | Integ |
|---|---|---|---|---|---|---|
| 1 | 57.882 | 29.238 | −26.7 | 39.591 | 222.4 | 3.58 |
| 10 | 44.709 | −13.2 | −32.5 | 35.08 | 247.9 | 7.33 |
| 11 | 40.538 | −6.838 | −34.88 | 35.541 | 258.91 | 9.12 |
| 12 | 37.622 | −3.574 | −35.01 | 35.187 | 264.17 | 10.78 |
| 13 | 33.554 | 0.667 | −35.82 | 35.823 | 271.07 | 14.42 |
| 14 | 29.633 | 10.906 | −33.69 | 35.406 | 287.94 | 15.08 |
| 15 | 28.753 | 17.181 | −30 | 34.572 | 299.8 | 14.59 |
| 16 | 25.725 | 20.455 | −27.91 | 34.605 | 306.23 | 18.78 |
| 17 | 25.725 | 20.455 | −27.91 | 34.605 | 306.23 | 13.36 |
| 18 | 42.092 | 44.648 | 12.245 | 46.296 | 15.336 | 11.23 |
| 26 | 42.217 | 56.479 | −0.063 | 56.479 | 359.94 | 12 |
| 27 | 43.041 | 58.035 | 6.459 | 58.394 | 6.351 | 13.53 |
| 28 | 42.576 | 59.592 | 13.068 | 61.008 | 12.368 | 17.78 |
| 29 | 45.175 | 57.693 | 22.789 | 62.034 | 21.554 | 15.66 |
| 30 | 49.756 | 54.313 | 43.49 | 69.579 | 38.685 | 19.03 |
| 31 | 54.919 | 51.232 | 61.285 | 79.878 | 50.106 | 26.06 |
| 32 | 55.654 | 48.487 | 63.968 | 80.267 | 52.838 | 25.07 |
| 37 | 54.814 | −47.13 | 8.759 | 47.935 | 169.47 | 5.51 |
| 38 | 54.771 | −50.6 | 21.036 | 54.794 | 157.42 | 7.64 |
| 39 | 55.107 | −48.75 | 28.337 | 56.384 | 149.83 | 8.54 |
| 40 | 57.293 | −48.99 | 35.586 | 60.553 | 144.01 | 9.48 |
| 41 | 58.559 | −46.84 | 41.751 | 62.745 | 138.29 | 10.81 |
| 42 | 62.958 | −43.12 | 51.078 | 66.842 | 130.17 | 11.37 |
| 43 | 63.602 | −41.01 | 56.238 | 69.639 | 126.08 | 14.05 |
| 44 | 78.361 | −7.98 | 82.837 | 83.22 | 95.502 | 13.96 |

What is claimed is:

1. A method for the coloration of a substrate comprising ink jet printing a first and second set of inks onto the substrate wherein:

(a) the first set of inks comprises one or more inks each of which independently contains a colorant selected from yellow, magenta, cyan and optionally black; and
   (b) the second set of inks comprises one or more inks each of which independently contains a dye selected from:

a yellow dye of Formula (1) or salt thereof:

Formula (1)

wherein:

X is a labile group or atom;
$R^1$ is alkyl or $-NH_2$;
A is $-NR^2R^3$, $-OR^2$ or halogen;
$R^2$ is H or optionally substituted alkyl; and
$R^3$ is optionally substituted phenyl;

an orange dye of Formula (2) or salt thereof:

Formula (2)

wherein:

$R^4$ is H or optionally substituted alkyl;
X is as hereinbefore defined;
B is $-NR^5R^6$, $-OR^5$ or halogen; and
$R^5$ and $R^6$ independently are H or optionally substituted alkyl;

a red dye of Formula (3) or salt thereof:

Formula (3)

wherein:

X is as hereinbefore defined;
E is $-NR^7R^8$, $-OR^7$ or halogen;
each $R^7$ is independently H or alkyl; and
$R^8$ is optionally substituted aryl;

and a blue dye of Formula (4) or salt thereof:

Formula (4)

wherein:

each X independently is as hereinbefore defined;
each L independently is an optionally substituted alkylene group;
each W independently is halogen or a group of the formula $-OR^9$ or $-NR^{10}R^{11}$;
$R^9$ is H or alkyl;
$R^{10}$ is H or optionally substituted alkyl; and
$R^{11}$ is an optionally substituted aryl group.

2. A method according to claim 1 wherein the first set of inks comprises an ink containing a yellow colorant, an ink containing a magenta colorant and an ink containing a cyan colorant.

3. A method according to claim 1 wherein the first set of inks comprises an ink containing a yellow colorant, an ink containing a magenta colorant, an ink containing a cyan colorant and an ink containing a black colorant.

4. A method according to claim 1 wherein the second set of inks comprises an ink containing a dye of Formula (1), an ink containing a dye of Formula (2), an ink containing a dye of Formula (3) and an ink containing a dye of Formula (4), wherein formulae (1) to (4) are as defined in claim 1.

5. A method according to claim 1 wherein:
(a) the first set of inks comprises an ink containing a yellow colorant, an ink containing a magenta colorant, an ink containing a cyan colorant and an ink containing a black colorant; and
(b) the second set of inks comprises an ink containing a dye of Formula (1), an ink containing a dye of Formula (2), an ink containing a dye of Formula (3) and an ink containing a dye of Formula (4), wherein formulae (1) to (4) are as defined in claim 1.

6. A method according to claim 1 wherein the colorant in each of the inks in the first set of inks is a reactive dye.

7. A method according to claim 6 wherein the reactive dye contains a halotriazine and/or a vinyl sulphone fibre-reactive group.

8. A method according to claim 1 wherein the cyan colorant in the first set of inks is a dye of the Formula (5) or salt thereof:

Formula (5)

wherein:
Pc is a phthalocyanine nucleus;
Z is —$NR^{12}R^{13}$, —$OR^{13}$ or halogen;
$R^{12}$ is H or optionally substituted alkyl;
$R^{13}$ is H, optionally substituted alkyl or optionally substituted aryl;
X is a labile atom or group;
a is 1 to 3;
b is 1 to 3; and
(a+b)=4.

9. A method according to claim 1 wherein the yellow colorant in the first set of inks is a dye of Formula (6) or salt thereof:

Formula (6)

wherein:
Y is halogen or a group of the formula —$NR^{15}R^{16}$ or —$OR^{16}$;
$R^{15}$ is H or optionally substituted $C_{1-4}$-alkyl;
$R^{15}$ is H optionally substituted alkyl or aryl;
$R^{14}$ is H, optionally substituted alkyl or aryl; and
each X independently is a labile atom or group.

10. A method according to claim 1 wherein the magenta colorant present in the first set of inks is a dye of Formula (7) or salt thereof:

Formula (7)

wherein:
G is halogen or a group of the formula —$NR^{17}R^{18}$ or —$OR^{17}$;
$R^{17}$ is H or optionally substituted alkyl;
$R^{18}$ is H, optionally substituted aryl or optionally substituted alkyl;
$R^{19}$ and $R^{20}$ are each independently $C_{1-4}$-alkyl; and
X is a labile atom or group.

11. A method according to claim 1 wherein the black colorant present in the first set of inks is a 1:2 Chromium (III) or Cobalt (III) complex, or mixture thereof, of the Formula (8) or salt thereof:

Formula (8)

wherein:
T is halogen or a group of the formula —$NR^{21}R^{22}$ or —$OR^{21}$;

$R^{21}$ is H or optionally substituted alkyl or optionally substituted aryl;

$R^{22}$ is H or optionally substituted alkyl;

M is Cr or Co; and

X is a labile atom or group.

12. A method according to claim 1 wherein the black colorant in the first set of inks is a dye of Formula (9) or a salt thereof:

Formula (9)

wherein:

X is a labile atom or group; and $R^{23}$ and $R^{24}$ are each independently H or optionally substituted alkyl.

13. A method according to claim 12 wherein the black colorant comprises:
(a) from 50 to 95 parts of the dye of the Formula (9);
(b) from 5 to 20 parts of a yellow dye; and
(c) from 10 to 30 parts of a red dye;
wherein all parts are by weight and the sum of the parts (a), (b) and (c)=100.

14. A method according to claim 1 wherein the magenta colorant in the first set of inks comprises a dye of the Formula (13) or a salt thereof:

Formula (13)

wherein:

Q is halogen or a group of the formula —$NR^{25}R^{26}$ or —$OR^{25}$;

$R^{25}$ is H or optionally substituted alkyl;

$R^{26}$ is H, optionally substituted aryl or optionally substituted alkyl; and

X is a labile atom or group.

15. A method according to claim 5 wherein the cyan colorant is as defined in claim 8, the yellow colorant is as defined in claim 9, the magenta colorant is as defined in claim 10, or claim 14 and the black colorant is as defined in claim 11 or claim 12.

16. A method according to claim 1 wherein each ink comprises a liquid medium.

17. A method according to claim 16 wherein the liquid medium comprises water and one or more organic solvents in a weight ratio of from 99:1 to 1:99.

18. A method according to claim 17 wherein the ink comprises the components:
(a) 0.5 to 20 parts of the relevant dye;
(b) 50 to 98 parts water; and
(c) 2 to 50 parts water-soluble organic solvent;
wherein all parts are parts by weight and the parts (a)+(b)+(c)=100.

19. A method according to claim 1 wherein the substrate is a textile.

20. A set of ink jet printing inks comprising a first and second set of inks wherein:
(a) the first set of inks comprises a yellow ink, a magenta ink, a cyan ink and optionally a black ink; and
(b) the second set of inks comprises one or more inks selected from:
an ink containing a dye of Formula (1) or salt thereof;
an ink containing a dye of the Formula (2) or a salt thereof;
an ink containing a dye of Formula (3) or a salt thereof; and
an ink containing a dye of Formula (4) or a salt thereof;
wherein the dyes of Formulae (1), (2), (3) and (4) are as defined in claim 1.

21. A set of ink jet printing inks according to claim 20 comprising:
(a) a first set of inks comprising:
a cyan ink containing a dye of the Formula (5) as defined in claim 8;
a yellow ink containing a dye of Formula (6) as defined in claim 9;
a magenta ink containing a dye of the Formula (7) as defined in claim 10 or a dye of the Formula (13) as defined in claim 14; and
and a black ink containing a dye of the Formula (8) as defined in claim 11 or a dye of the Formula (9) as defined in claim 12; and
(b) a second set of inks comprising from one to four inks selected from:
an ink containing a dye of Formula (1);
an ink containing a dye of Formula (2);
an ink containing a dye of Formula (3); and
an ink containing a dye of Formula (4).

22. A process for the coloration of a textile material comprising:
(i) applying to the textile material by ink-jet printing the inks from the first and second sets of ink in accordance with the method of claim 1; and
(ii) heating the textile at a temperature of from 50° C. to 250° C. to fix the dye on the textile.

23. A process according to claim 22 wherein the textile is a cellulosic material.

24. A textile coloured by means of a process according to claim 22.

25. A process according to claim 1 wherein the substrate is paper.

26. A paper coloured by a process according to claim 25.

27. A photorealistic print prepared using the coloration method according to of claim 1.

28. An ink jet printer, characterised in that the printer contains at least one ink from the first set of inks and at least one ink from the second set of inks, wherein the first and second sets of inks are as defined in claim 1.

29. An ink jet printer according to claim 28, characterised in that it has a separate channel to direct each ink colour in the first and second set of inks to a nozzle or array of nozzles dedicated to that colour.

30. An ink jet printer according to claim 29 which has from 5 to 8 channels.

31. An ink cartridge suitable for use in an ink jet printer which comprises a container in which are held the first and second set of ink, wherein the first and second set of ink are as defined in claim 20.

32. An ink jet printer according to claim 28 containing an ink cartridge according to claim 31.

* * * * *